(12) United States Patent
Ferreri et al.

(10) Patent No.: US 10,057,462 B2
(45) Date of Patent: Aug. 21, 2018

(54) MECHANISM TO PERFORM FORCE BLACK COLOR TRANSFORMATION

(71) Applicants: Vincent William Ferreri, Frederick, CO (US); Walter F. Kailey, Frederick, CO (US); Larry M. Ernst, Longmont, CO (US); Claudiu Gabriel Cebuc, Timisoara (RO)

(72) Inventors: Vincent William Ferreri, Frederick, CO (US); Walter F. Kailey, Frederick, CO (US); Larry M. Ernst, Longmont, CO (US); Claudiu Gabriel Cebuc, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 15/383,708

(22) Filed: Dec. 19, 2016

(65) Prior Publication Data

US 2018/0176421 A1  Jun. 21, 2018

(51) Int. Cl.
*H04N 1/60* (2006.01)
*H04N 1/64* (2006.01)
*H04N 1/405* (2006.01)

(52) U.S. Cl.
CPC .......... *H04N 1/6025* (2013.01); *H04N 1/405* (2013.01); *H04N 1/6005* (2013.01); *H04N 1/6008* (2013.01); *H04N 1/646* (2013.01)

(58) Field of Classification Search
CPC .... H04N 1/6025; H04N 1/6005; H04N 1/405; H04N 1/6008; H04N 1/646
See application file for complete search history.

(56) References Cited

U.S. PATENT DOCUMENTS

| | | |
|---|---|---|
| 4,887,150 A | 12/1989 | Chiba et al. |
| 6,873,434 B1 | 3/2005 | Kohler et al. |
| 7,046,393 B2 | 5/2006 | Zeng |
| 7,259,893 B2 | 8/2007 | Falk et al. |
| 7,307,753 B2 | 12/2007 | Sasaki et al. |
| 7,859,722 B1 | 12/2010 | Kulkarni |
| 7,995,237 B2 | 8/2011 | Haikin et al. |
| 8,131,070 B2 | 3/2012 | Sasaki |
| 8,253,979 B2 | 8/2012 | Wen et al. |
| 8,582,188 B2 | 11/2013 | Sanchez et al. |
| 8,587,828 B2 | 11/2013 | Qiao et al. |
| 8,593,693 B2 | 11/2013 | Qiao et al. |
| 8,605,329 B2 | 12/2013 | Shestak et al. |
| 8,767,258 B2 | 7/2014 | Shestak et al. |
| 9,258,455 B2 | 2/2016 | Li et al. |

(Continued)

FOREIGN PATENT DOCUMENTS

| | | |
|---|---|---|
| JP | 4010959 | 1/1992 |
| JP | 4346571 | 12/1992 |
| JP | 8010902 | 4/2016 |

*Primary Examiner* — Christopher D Wait
(74) *Attorney, Agent, or Firm* — Jaffery Watson Mendonsa & Hamilton LLC (57) ABSTRACT

A printing system is disclosed. The printing system includes a color management unit including one or more color caches to store input colors and corresponding output colors and a color engine (CE) to receive input colors and perform Force-K transformations to map near black input colors into pure black output colors by dynamically identifying the near black input colors based on chroma values and effective output values.

24 Claims, 10 Drawing Sheets

(56) References Cited

U.S. PATENT DOCUMENTS

2011/0149307 A1* 6/2011 Tin ................... H04N 1/6033
                                                  358/1.9
2013/0016370 A1* 1/2013 Shestak ............ H04N 1/6025
                                                  358/1.9

* cited by examiner

```
// Class for holding a LUT and color-cache that will work together as
// a single resource for doing color conversions.
class colorResource
{
public:
// Overloaded constructor can construct on an input ICC profile
// (to create the color-to-C-and-k LUT) or a normal LUT.
colorResource( const colorLUT &lut );
colorResource( const iccProfile &profile );
// Function to check if a cache contains an input color. If so,
// then the corresponding output color is populated.
bool cacheContains( const color &cIn, color *cOut )
{ return cache_.contains( cIn, cOut ); }
// Function to interpolate an input color in the LUT. The output
// color is then added to the cache and returned.
color interpolate( const color &cIn )
{
color cOut = lut_.interpolate( cIn );
add2Cache( cIn, cOut );
return cOut;
}
// Function for adding input/output color pairs to the cache
void add2Cache( const &cIn, const &cOut )
{
if( cache_.isFull() )
cache_.reset();
cache_.add( cIn, cOut );
}
// Get the color, either from the cache or by interpolating,
// whatever is required.
color getColor( const color &cIn )
{
color cOut;
if( !cacheContains( cIn, &cOut ) )
cOut = interpolate( cIn );
return cOut;
}
// Helper function for resetting the color-cache
void resetCache()
{ cache_.reset(); }
private:
colorCache cache_;
colorLUT lut_;
};
// Class for actually doing color management. Once constructed, an
// input color is determined to be Force-K or not and then the
// appropriate color returned.
class colorConverter
{
public:
// Constructor
colorConverter( const colorLUT &lut, const iccProfile &profile ) :
lutResource_( lut ),
kResource_( profile ),
chromaThreshold_( 5.0 )
{}
// Setter method for the chroma threshold
void setChromaThreshold( double chromaThreshold )
```

FIG. 5A

```
{
chromaThreshold_ = chromaThreshold;
lutResource_.resetCache();
}
// Method for doing a color conversion
color convert( const color &cIn )
{
// Check if the input color has been encountered before
color cOut;
if( lutResource_.contains( cIn, &cOut )
return cOut;
// This is a 'new' input color, so we need to get the
// chroma and effective k-value from the kResource_. Note
// that the color object is a generic container for arrays
// of color data.
color kInfo = kResource_.getColor( cIn );
// The first element of kInfo is the chroma of cIn and the
// second element is the effective k-value IF the color
// will be Force-K
if( kInfo[0] <= chromaThreshold_ )
{
cOut = [ 0, 0, 0, kInfo[1] ];
lutResource.add2Cache( cIn, cOut );
}
else
cOut = lutResource.interpolate( cIn );
return cOut;
}
private:
colorResource lutResource_;
colorResource kResource_;
double chromaThreshold_;
};
```

```
// Class for holding a LUT and color-cache that will work together as
// a single resource for doing color conversions.
class forceKResource
{
public:
// Constructor
forceKResource( const colorLUT &lut ) :
colorResource()
{
// Use the input LUT to create a new LUT that will be used
// for interpolation. This new LUT is the same as the
// input LUT, but adds 2 more output planes: 1 for Chroma
// and the other for the effective-K
lut_.setNumInColor( lut.getNumInColor() );
lut_.setNumOutColor( lut.getNumOutColor() );
lut_.setNumNodes( lut.getNumNodes() ); // allocates memory
for( int i = 0; i < lut.getNumNodes(); i++ )
{
lut_[i] = [ lut[i],
computeChroma( lut[i] ),
computeK( lut[i] ) ];
}
}
// Function to check if a cache contains an input color. If so,
// then the corresponding output color is populated.
bool cacheContains( const color &cIn, color *cOut )
{ return cache_.contains( cIn, cOut ); }
// Function to interpolate an input color in the LUT. The output
// color is NOT added to the cache before it is returned.
color interpolate( const color &cIn )
{
color cOut = lut_.interpolate( cIn );
return cOut;
}
// Function for adding input/output color pairs to the cache
void add2Cache( const &cIn, const &cOut )
{
if( cache_.isFull() )
cache_.reset();
cache_.add( cIn, cOut );
}
// Helper function for resetting the color-cache
void resetCache()
{ cache_.reset(); }
private:
colorCache cache_;
colorLUT lut_;
}
// Class for actually doing color management. Once constructed, an
// input color is determined to be Force-K or not and then the
// appropriate color returned.
class colorConverter
{
public:
// Constructor
colorConverter( const colorLUT &lut ) :
forceKResource_( lut ),
```

FIG. 7A

```
chromaThreshold_( 5.0 )
{}
// Setter method for the chroma threshold
void setChromaThreshold( double chromaThreshold )
{
chromaThreshold_ = chromaThreshold;
forceKResource_.resetCache();
}
// Method for doing a color conversion
color convert( const color &cIn )
{
// Check if the input color has been encountered before
color cOut;
if( forceKResource_.contains( cIn, &cOut ) )
return cOut;
// Interpolate the input color in the lut to get the output
// color AND chroma/k-effective
color cTemp = kResource_.interpolate( cIn );
// Check if this is a Force-K color
if( cTemp[4] <= chromaThreshold_ )
cOut = [ 0, 0, 0, cTemp[5] ];
else
cOut = [ cTemp[0], cTemp[1], cTemp[2], cTemp[3] ];
// Add the output color to the cache for next time
forceKResource_.add2Cache( cIn, cOut );
return cOut;
}
private:
forceKResource forceKResource_;
double chromaThreshole_;
};
```

MECHANISM TO PERFORM FORCE BLACK COLOR TRANSFORMATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to the field of color management, and in particular, to mapping pure input colors via color management to true output colors.

BACKGROUND

In commercial and transactional printers it is common to apply a Force-Black (Force-K) transformation to colors in order to produce a more desirable color output and/or save ink/toner. This transformation essentially maps input colors that are near black (e.g., where the exact nearness is often governed by a threshold) into pure black (or gray scale) colors. More precisely, this is done by converting the input color into the CIE LAB color space (by means of input International Color Consortium (ICC) profiles) and subsequently computing the chroma, C, which is computed as:

$C=\mathrm{sqrt}(A^2+B^2)$, where the input color is (L,A,B).

If the chroma is determined to be below some threshold, the input color is a Force-K candidate and an output CMYK color of c=m=y=0, k is returned, where the k value is some function of the L-value of the original input color (e.g., k=255*(L−L_min)/(L_max−L_min)). While this is the established procedure for computing a Force-K color, it can be expensive in both time and processing power.

A common alternative for obtaining Force-K colors is to modify an intermediate Look-Up Table (LUT), from which all colors are interpolated. Essentially, all LUT nodes matching the input criteria for a Force-K color are manually modified to insure that the output color is K-only, regardless of the original output color values in the LUT. For example, an RGB LUT may have all of its nodes with input colors (x,x,x) mapped to an output CMYK color of (0,0,0,k'), where the value of k' is generally some function of x, and various formulas/expressions may be used.

While this design provides a fast/efficient solution to the Force-K problem, it can lead to color artifacts and the contamination of many colors, because modifications to the LUT can produce far-reaching color changes in the areas near the modified nodes. Colors that are themselves not actually Force-K may be heavily influenced by a nearby Force-K node in the LUT. Alternatively, true Force-K colors may still not be preserved in all cases because the Force-K boundary is often a curved manifold in the high-dimensional input space and interpolation across the boundary will often introduce color impurities.

Also, other problems may be introduced where color management becomes insensitive to the chroma threshold. The ability to accurately and reliably reproduce the Force-K transition surface is heavily influenced by the LUT node spacing. That is, for coarser LUT grids the chroma threshold may be modified without any actual difference in LUT nodes being realized. If the Force-K boundary moves, but doesn't actually traverse any new nodes, the LUT will not change.

A traditional solution to these problems has been to add more LUT nodes, which comes at the cost of greatly increasing the LUT size; or to check each color for Force-K explicitly, which also comes at the extreme cost of always having to convert every input color to the LAB space so that the chroma can be computed and compared to the threshold value. Thus, present solutions are rather costly, either in terms of memory usage or in run-time.

Accordingly, an efficient and accurate mechanism to perform Force-K transformations is desired.

SUMMARY

In one embodiment, a printing system is disclosed. The printing system includes a color management unit including one or more color caches to store input colors and corresponding output colors, and a color engine (CE) to receive input colors and perform Force-K transformations to map near black input colors into pure black output colors by dynamically identifying the near black input colors based on chroma values and effective output values.

In a further embodiment, a method is disclosed including receiving an input color and performing a Force-K transformation to map an input color into a pure black output color upon dynamically identifying the near black color based on a chroma value and an effective output value.

BRIEF DESCRIPTION OF THE DRAWINGS

A better understanding of the present invention can be obtained from the following detailed description in conjunction with the following drawings, in which:

FIGS. 5A & 5B illustrate one embodiment of code implemented to perform a Force-K transformation;

FIGS. 7A & 7B illustrate another embodiment of code implemented to perform a Force-K transformation.

DETAILED DESCRIPTION

A mechanism to perform Force-K transformations is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
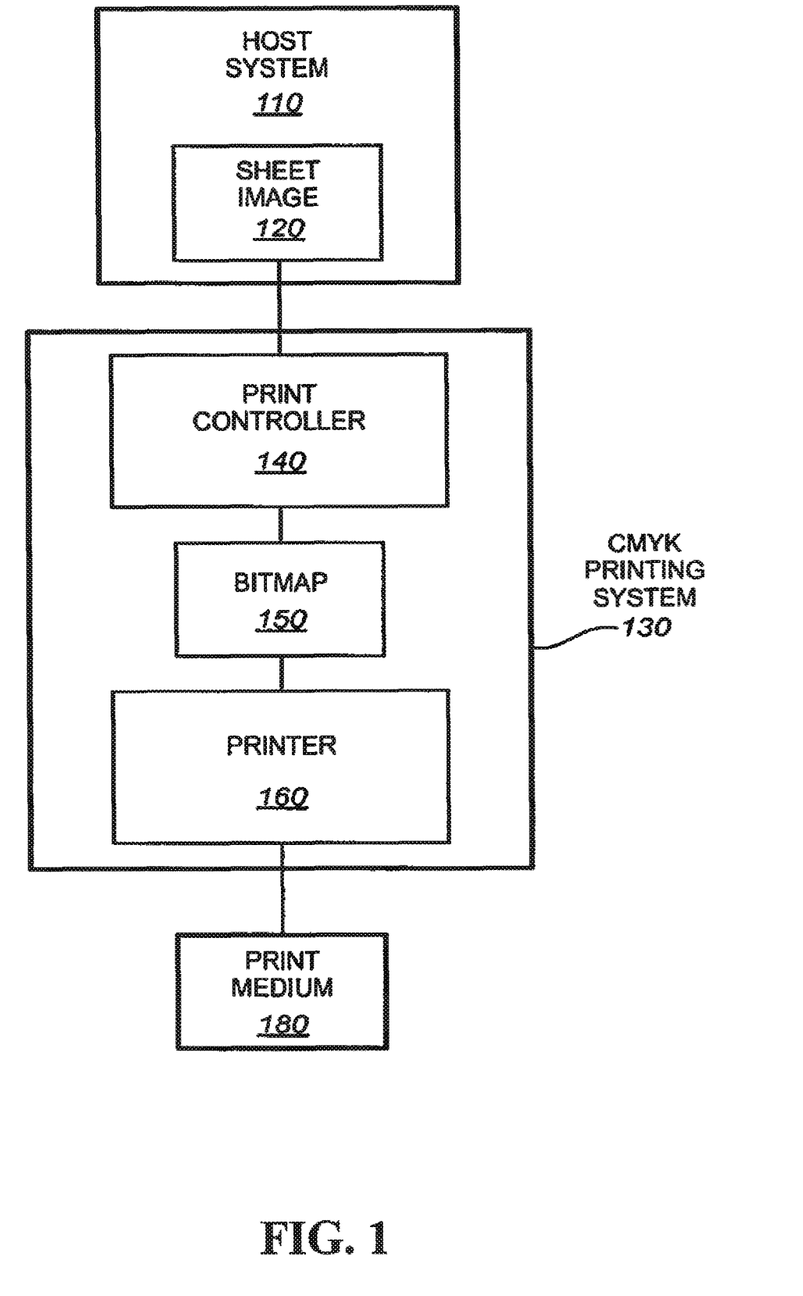
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
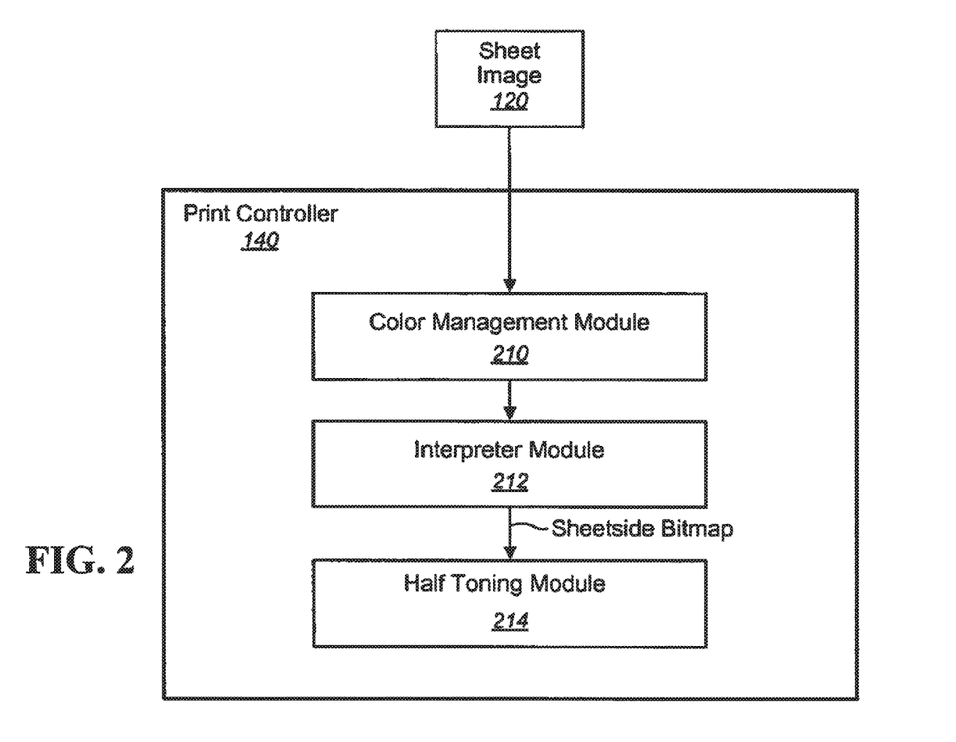
FIG. 2 is a block diagram of one embodiment of a print controller.

FIG. 2 is a block diagram illustrating one embodiment of a print controller 140. The print controller 140 (e.g., DFE or digital front end), in its generalized form, includes color management module 210, interpreter module 212 and halftoning module 214. Color management module 210 provides a color mapping from an input color space to a printer 160 color space.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pixels representing an image of the print job (i.e., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines. Halftoning module 214 is operable to represent the sheetside bitmaps as halftone patterns of ink. For example, halftoning module 214 may convert the pixels to halftone patterns of CMYK ink for application to the paper.

Figure 3:
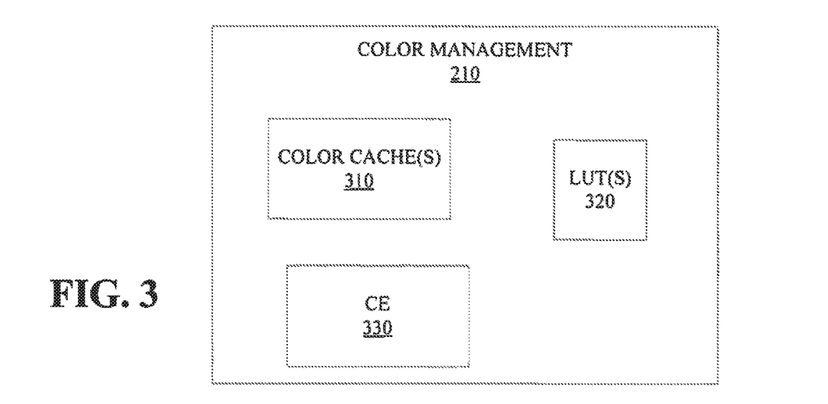
FIG. 3 illustrates one embodiment of a color management unit.

In one embodiment, color management unit 210 uses ICC profiles to perform a color managed workflow by mapping to determine CMYK values for each pixel in a particular object to be printed at printer 160. FIG. 3 is a block diagram illustrating one embodiment of a color management unit 210. Color management unit 210 includes one or more color caches 310, and one or more color lookup tables (LUTs) 320. Color cache(s) 310 may be hardware and/or software components that store color mapping data so that future requests for that data can be served faster.

In one embodiment, color management unit 210 includes a color engine (CE) 330 to perform a lookup of color cache 310 upon receiving an input color to determine if the input color is included in color cache 310 with a corresponding output color. If so, the output color is provided for the color management workflow. However, if there is no entry in color cache 310, LUT 320 is utilized to perform a multi-dimensional interpolation in order to generate the output color. Next, the input color and the resulting output color are stored as an entry in color cache 310 for later use.

Color management unit 210 also performs Force-K transformations to map input colors that are near black into a pure black (or gray scale) color. According to one embodiment, color management unit 210 dynamically identifies Force-K input colors in order to perform the transformation. In such an embodiment, chroma (C) and effective output k (k') values are stored in color cache 310 for use in the transformation.

In one embodiment, a second cache 310 and LUT are provided to quickly convert an input color to a {C,k'} tuple (e.g. a pair). Accordingly, the second LUT 320 is an n-to-2 dimensional LUT (where n is the dimension of the input color space) that will allow the chroma and nominal Force-K value to be interpolated for any input color. The second associated color-cache 310 stores the history of recently encountered colors.

Figure 4:
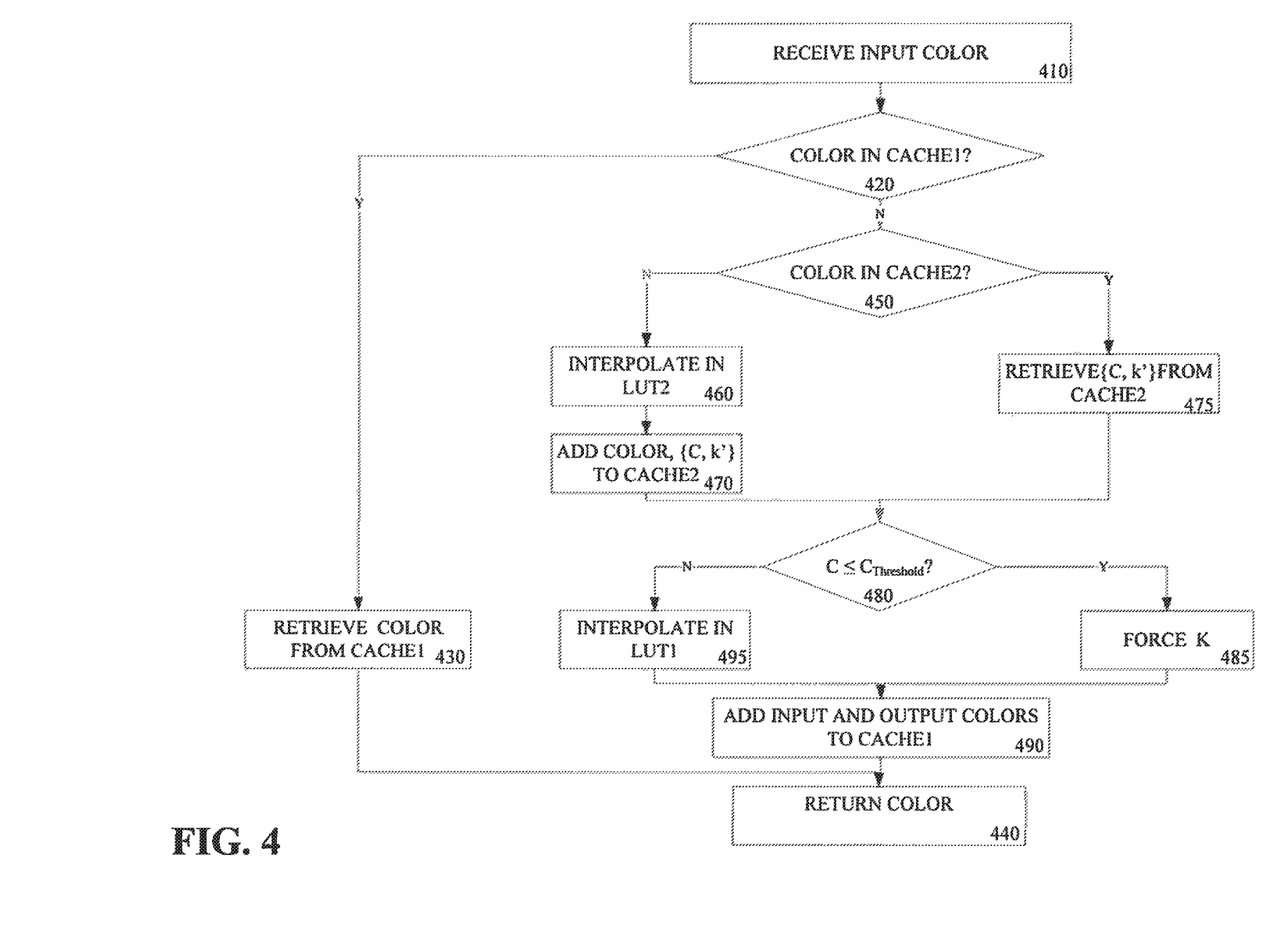
FIG. 4 is a flow diagram illustrating one embodiment of a process for performing a Force-K transformation.

FIG. 4 is a flow diagram illustrating one embodiment for performing a Force-K process. At processing block 410, an input color is received at color management unit 210. At decision block 420, a determination is made as to whether an input color is in the first color cache 310. If so, an output color corresponding to the input color is retrieved from the first color cache 310, processing block 430. At processing block 440, the output color is returned.

If at decision block 420, a determination is made that the input color is not in the first cache 310, a determination is made as to whether the input color is in the second color cache 310, decision block 450. If the input color is not found in the second-color-cache, the second-LUT 320 is implemented to perform a full n-to-2 dimensional interpolation to compute the color chroma, C, and the effective k', processing block 460. At processing block 470, the input color and the (C,k') pair are stored in the second color cache 310 for future use. If the input color is found in the second color cache 310, the (C,k') pair are retrieved, processing block 475.

Figure 5B:
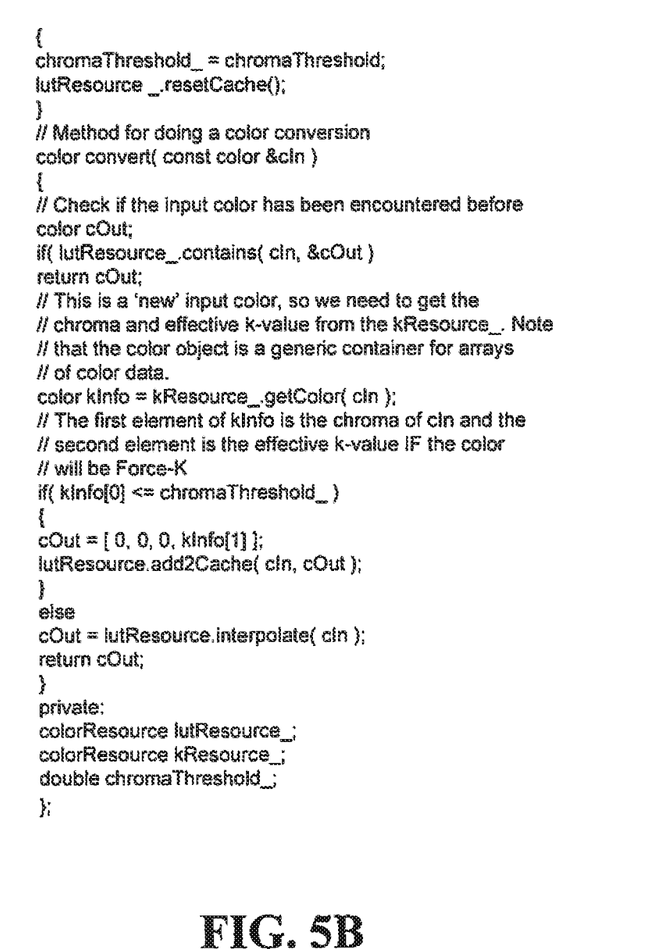

The C value from above is subsequently compared to a predefined threshold. Thus at decision block 480, a determination is made as to whether C≤C_threshold. If so, the color is a Force-K color in which the output color is (0,0,0, k'), processing block 485. Next, the input color and the output color are stored in the first cache 310, processing block 490. If C>C_threshold, the color is not a Force-K color, resulting in a multi-dimensional interpolation being performed to generate an unforced output color at the first LUT 320, processing block 495, prior to the input color and the output color being stored in the first cache 310 at processing block 490. Subsequently, the output color is returned at processing block 440. FIGS. 5A & 5B illustrate one embodiment of code implemented to perform the above-described Force-K transformation.

The above-described transformation process precisely produces Force-K colors, while non-Force-K colors will not be corrupted or impacted by modified LUT nodes in the first LUT. In other embodiments it is more efficient to implement a square of the chroma rather than computing and thresholding the actual chroma so as to avoid a square root operation. Further, this process may result in additional processing time. This is attributed to at least one interpolation is always needed, and sometimes two.

According to one embodiment, the process may be improved by combining the two separate LUTs/caches into a single LUT/cache. In such an embodiment, the chroma and effective output value calculations may be performed during interpolation and stored in a common cache with the associated input and output colors.

Figure 6A:
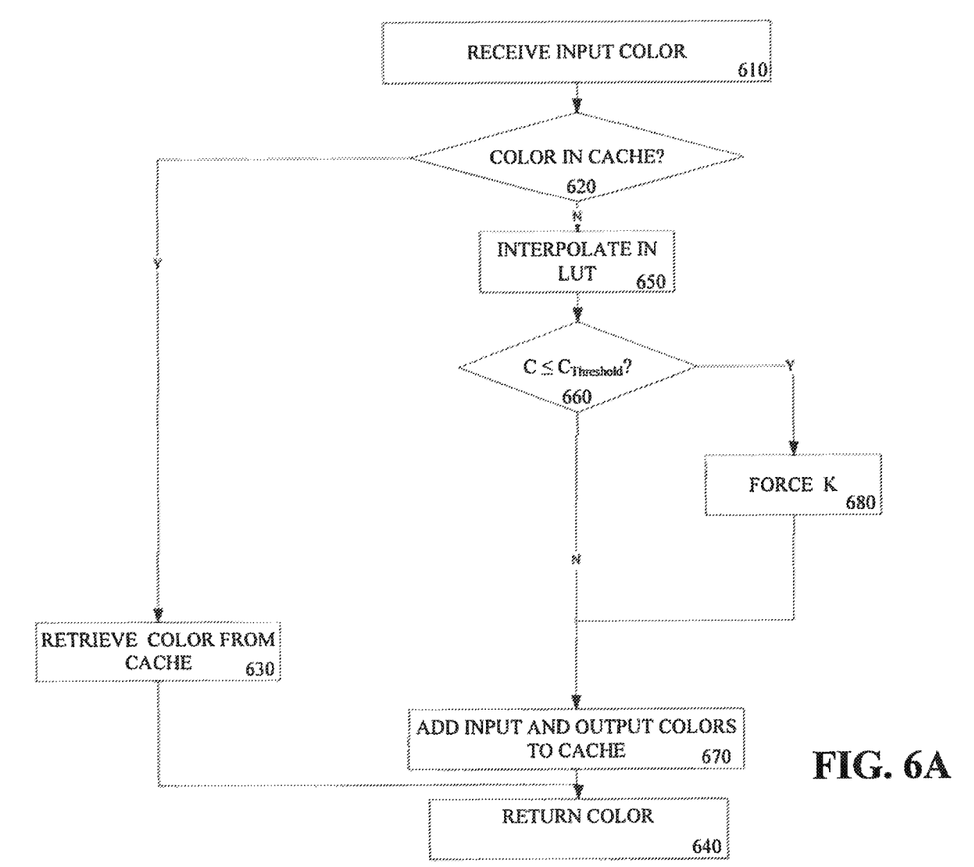
FIGS. 6A & 6B are flow diagrams illustrating other embodiments of a process for performing a Force-K transformation.

FIG. 6A is a flow diagram illustrating one embodiment for performing a Force-K process with a common cache and a common LUT. At processing block 610, an input color is received at color management unit 210. At decision block 620, a determination is made as to whether an input color is in color cache 310. If so, an output color corresponding to the input color is retrieved from cache 310, processing block 630. At processing block 640, the output color is returned. In other embodiments, the common cache may be one or more cache and/or the common LUT may be one or more LUT's.

If at decision block 620, a determination is made that the input color is not in cache 310, interpolation is performed at LUT 320, processing block 650. In such an embodiment, LUT 320 performs a full n-to-6 dimensional interpolation to compute the color chroma, C, and the effective k', in addition to performing the multidimensional interpolation to generate an unforced output color. Thus, LUT 320 maps the input color to a generated output color and (C,k') pair.

Figure 7B:
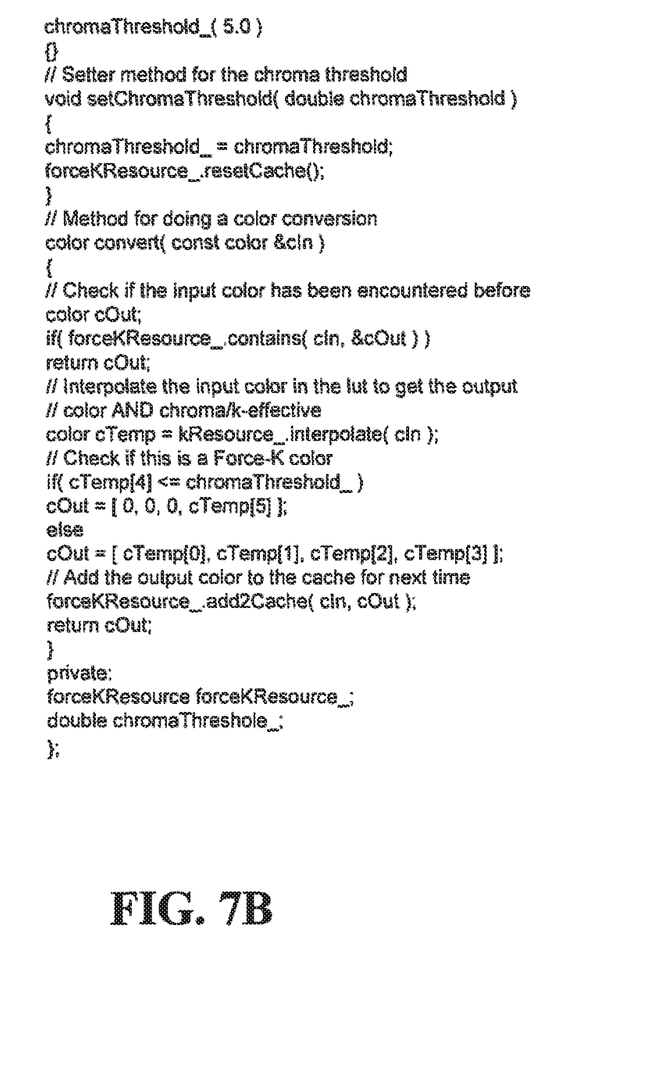

At decision block 660, a determination is made as to whether C≤C_threshold. If C>C_threshold, the input color is not a Force-K color, and the output color is set to the unforced output color. Next, the input color and the output color are stored in the cache 310 at processing block 670. If C≤C_threshold, the input color is a Force-K color and the output color is set to the forced color (0,0,0,k'), processing block 680. At processing block 670, the input color and the output color are stored in cache 310. Subsequently, the output color is returned at processing block 640. FIGS. 7A & 7B illustrate one embodiment of pseudo-code implemented to perform the above-described Force-K transformation.

Figure 6B:
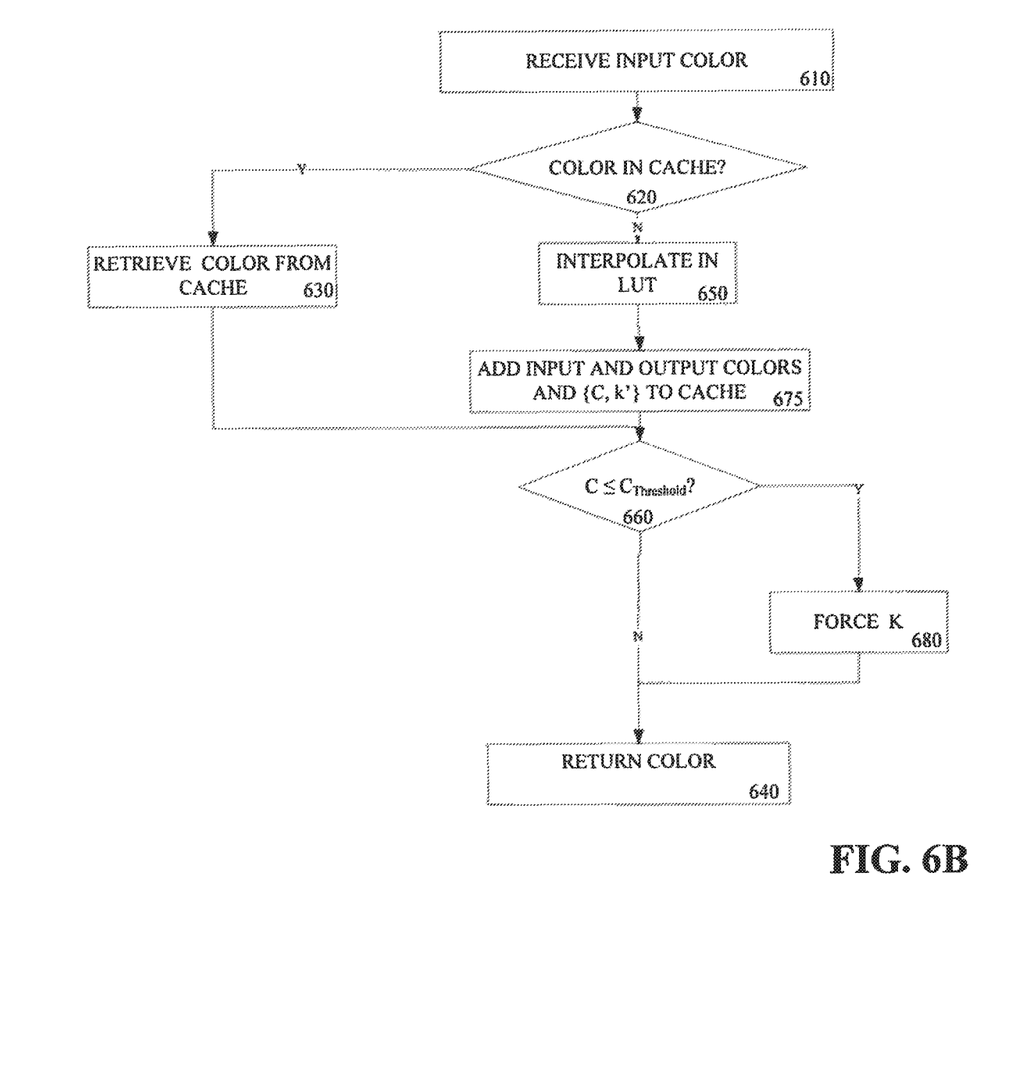

FIG. 6B is a flow diagram illustrating another embodiment for performing a Force-K process with a common cache and a common LUT. At processing block 610, an input color is received at color management unit 210. At decision block 620, a determination is made as to whether an input color is in color cache 310. If so, a generated output color and (C,k') pair corresponding to the input color is retrieved from cache 310, processing block 630. At decision block 660, a determination is made as to whether C≤C_threshold. If C>C_threshold, the input color is not a Force-K color and the output color is set to the retrieved output color. Subsequently, the output color is returned at processing block 640. If C≤C_threshold, the input color is a Force-K color in which the output color is set to the forced color (0,0,0,k'), processing block 680. Subsequently, the output color is returned at processing block 640. In other embodiments, the common cache may be one or more cache and/or the common LUT may be one or more LUT's.

If at decision block 620, a determination is made that the input color is not in cache 310, interpolation is performed at LUT 320, processing block 650. In such an embodiment, LUT 320 performs a full n-to-6 dimensional interpolation to compute the color chroma, C, and the effective k', in addition to performing the multidimensional interpolation to generate an unforced output color. Thus, LUT 320 maps the input color to a generated output color and (C,k') pair.

At processing block 675, the input color, the generated unforced output color and the (C,k') pair are stored in the cache 310. At decision block 660, a determination is made as to whether C≤C_threshold. If C≤C_threshold, the input color is not a Force-K color and the output color is set to the generated unforced output color. Subsequently, the output color is returned at processing block 640. If C≤C_threshold, the input color is a Force-K color in which the output color is set to the forced color (0,0,0,k'), processing block 680. Subsequently, the output color is returned at processing block 640.

The embodiment disclosed in FIG. 6B allows that the C threshold value may be changed dynamically and each received color may then be dynamically processed according to the current C threshold value. By checking C against the current C_threshold before each output color is returned and storing the (C,k') pair and the unforced output colors in the cache, the Force-K input colors may be dynamically identified, transformed and output colors returned corresponding to changes in the C_threshold. In that case, there is no need to clear the cache because the C threshold has changed. By setting the C threshold value to a minimum, no received colors will have a Force-K transformation (i.e. all output colors will be corresponding generated unforced colors). By setting the C threshold value to a maximum, all received colors will have a Force-K transformation (i.e. all output colors will be corresponding forced colors).

The above-described Force-K transformation mechanisms provide an additional layer of caching for the mapping of input-color to chroma and effective k-value that leads to faster determinations of Force-K colors over conventional methods. Further, the mapping of input colors to chroma is embedded directly in an input ICC profile. Additionally, the effective k' for Force-K colors is computed once, for all colors. Thus, the chroma threshold can be changed on-the-fly without the need to re-compute an entire Force-K LUT. Particularly, only a first color cache need be reinitialized so as to clear out any previously stored computed Force-K colors which may be stored there. Moreover, LUT sizes can be decreased since the chroma-threshold now affects output colors in a manner independent of the LUT node spacing. Accordingly, there is no need to have excessively large LUTs, which allows for more dynamic LUT grid spacings. The C threshold value may be adjustable via a user interface and/or by print controller 140. When the C threshold value changes, the color caches may be reset so that input colors may be identified as Force-K colors according to the new C threshold value. However, the color caches including the (C,k') pair need not be cleared or reset when the C threshold value changes because the (C,k') pair is independent of the C threshold.

Figure 8:
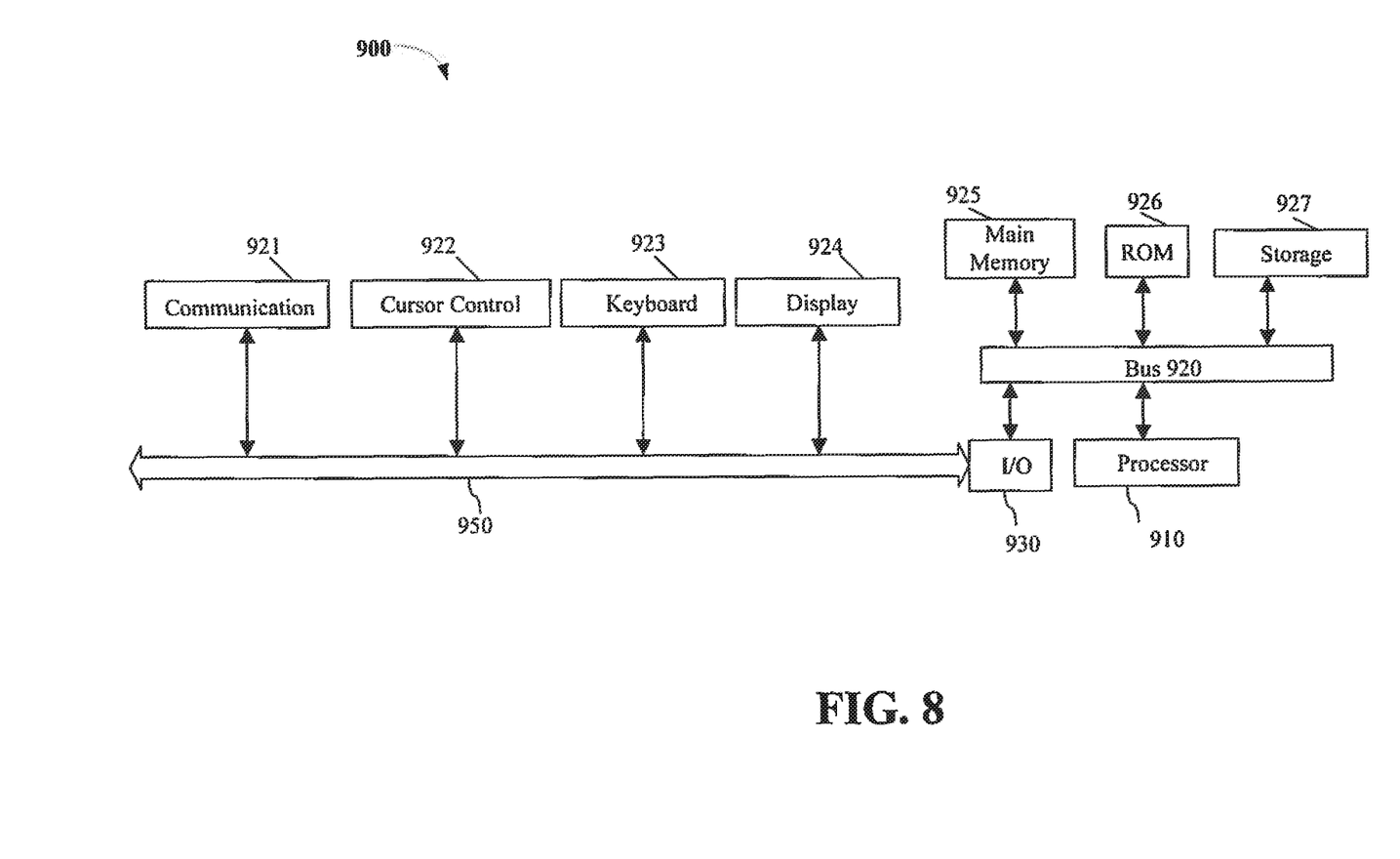
FIG. 8 illustrates one embodiment of a computer system.

FIG. 8 illustrates a computer system 900 on which printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
    a memory to store
        an interpreter module and a color management unit, including:
            a first color cache to store input colors and corresponding output colors;
            a second color cache to store the input colors and corresponding chroma values and effective output values; and
            a color engine (CE); and
    a processor to receive print job data, execute the interpreter module to convert the print job data to one or more sheetside bitmaps, execute the color management unit to cause the CE to receive the input colors and perform Force-K transformations to map near black input colors into pure black output colors by dynamically identifying the near black input colors based on the chroma values and the effective output values, and transmit the one or more sheetside bitmaps to be printed.

2. The printing system of claim 1, further comprising a printer to print the one or more sheetside bitmaps.

3. The printing system of claim 1, wherein the color management unit further comprises:
    a first lookup table (LUT) to generate the output colors corresponding to the input colors received at the color management unit; and
    a second LUT to generate the chroma values and the effective output values corresponding to the input colors received at the color management unit.

4. The printing system of claim 3, wherein the processor further executes the color management unit to cause the CE to retrieve a chroma value and an effective output value upon a determination that an input color has been previously added to the second color cache.

5. The printing system of claim 4, wherein the processor further executes the color management unit to cause the second LUT to generate the chroma value and the effective output value corresponding to the input color upon a determination that the input color has not been previously added to the second color cache.

6. The printing system of claim 5, wherein the processor further executes the color management unit to cause the CE to make a determination as to whether the chroma value is less than or equal to a threshold chroma value.

7. The printing system of claim 6, wherein the processor further executes the color management unit to cause the CE to save the effective output value in the first color cache as the output color corresponding to the input color upon a determination that the chroma value is less than or equal to the threshold chroma value.

8. The printing system of claim 7, wherein the processor further executes the color management unit to cause the second LUT to generate an output color corresponding to the input color upon a determination that the chroma value is greater than the threshold chroma value and saves the output color in the first color cache.

9. The printing system of claim 6, wherein the threshold chroma value is adjustable.

10. The printing system of claim 1, wherein the color management unit further comprises a first lookup table (LUT) to generate output colors, chroma values and effective output values corresponding to the input colors received at the color management unit.

11. The printing system of claim 10, the processor further executes the color management unit to cause the first LUT to generate the output color, the chroma value and the effective output value corresponding to the input color upon a determination that an input color has not been previously added to the first color cache.

12. The printing system of claim 11, wherein the processor further executes the color management unit to cause the CE to make a determination as to whether the chroma value is less than or equal to a threshold chroma value and returns the effective output value as the output color upon a determination that the chroma value is less than or equal to the threshold chroma value.

13. The printing system of claim 12, wherein the processor further executes the color management unit to cause the CE to return the generated output color upon a determination that the chroma value is greater than the threshold chroma value and saves the output color in the first color cache.

14. The printing system of claim 13, wherein the one or more color caches further store the chroma values and the effective output values, and wherein a first color cache stores the input colors and the corresponding output colors, the chroma values and the effective output values.

15. The printing system of claim 14, wherein the processor further executes the color management unit to cause the CE to save the generated output color, the chroma value and the effective output value in the first color cache corresponding to the input color.

16. A machine-readable medium including data that, when accessed by a machine, cause the machine to:
receive print job data;
convert the print job data to one or more sheetside bitmaps;
perform color management on the one or more sheetside bitmaps, including;
receiving an input color;
storing the input color and a corresponding output color are stored in a first color cache;
storing the input color and the corresponding chroma value and effective output value are stored in a second color cache; and
performing a Force-K transformation to map a near black input color into a pure black output color upon dynamically identifying the near black color based on the chroma value and the effective output value; and
transmitting the one or more sheetside bitmaps to be printed.

17. The machine-readable medium of claim 16, including data that, when accessed by a machine, further cause the machine to print the one or more sheetside bitmaps.

18. The machine-readable medium of claim 17, including data that, when accessed by a machine, further cause the machine to:
generate the output color corresponding to the input color at a first lookup table (LUT) upon a determination that the input color is not stored in the first color cache; and
generate the chroma value and the effective output value corresponding to the input color at a second LUT upon a determination that the input color is not stored in the second color cache.

19. The machine-readable medium of claim 18, including data that, when accessed by a machine, further cause the machine to:
retrieve the chroma value and the effective output value upon a determination that the input color has been previously added to the second color cache; and
generate the chroma value and the effective output value corresponding to the input color at the second LUT upon a determination that the input color has not been previously added to the second color cache.

20. The machine-readable medium of claim 18, including data that, when accessed by a machine, further cause the machine to:
determine whether the chroma value is less than or equal to a threshold chroma value; and
save the effective output value in the first color cache as an output color corresponding to the input color upon a determination that the chroma value is less than or equal to the threshold chroma value.

21. The machine-readable medium of claim 16, including data that, when accessed by a machine, further cause the machine to generate the output color, the chroma value and the effective output value corresponding to the input color at a lookup table (LUT) upon a determination that the input color is not stored in the color cache.

22. The machine-readable medium of claim 21, including data that, when accessed by a machine, further cause the machine to:
determine whether the chroma value is less than or equal to a threshold chroma value; and
return the effective output value as the output color upon a determination that the chroma value is less than or equal to the threshold chroma value.

23. The machine-readable medium of claim 22, wherein the input color and the corresponding output color, chroma value and effective output value are stored in a color cache.

24. The printing system of claim 20, wherein the threshold chroma value is adjustable.

* * * * *